United States Patent
Zenil et al.

(10) Patent No.: US 11,175,230 B2
(45) Date of Patent: Nov. 16, 2021

(54) PORTABLE DEVICE FOR IMAGING BIOLOGICAL SAMPLE

(71) Applicant: OXFORD IMMUNE ALGORITHMICS LTD., Reading (GB)

(72) Inventors: Hector Zenil, Reading (GB); Jürgen Hermann Richard Riedel, Reading (GB)

(73) Assignee: OXFORD IMMUNE ALGORITHMICS LTD., Reading (GB)

(*) Notice: Subject to any disclaimer, the term of this patent is extended or adjusted under 35 U.S.C. 154(b) by 0 days.

(21) Appl. No.: 17/336,765

(22) Filed: Jun. 2, 2021

(65) Prior Publication Data

US 2021/0318248 A1    Oct. 14, 2021

Related U.S. Application Data

(63) Continuation of application No. PCT/GB2020/053288, filed on Dec. 18, 2020.

(30) Foreign Application Priority Data

Dec. 20, 2019 (GB) ................................ 1918948

(51) Int. Cl.
 *G01N 21/64* (2006.01)
(52) U.S. Cl.
 CPC .............................. *G01N 21/6486* (2013.01)
(58) Field of Classification Search
 None
 See application file for complete search history.

(56) References Cited

U.S. PATENT DOCUMENTS

| | | | |
|---|---|---|---|
| 2001/0051377 A1* | 12/2001 | Hammer | G01N 35/00029 436/43 |
| 2013/0083317 A1 | 4/2013 | Fujii et al. | |
| 2016/0004057 A1 | 1/2016 | Lin et al. | |
| 2018/0313765 A1 | 11/2018 | Landers et al. | |

FOREIGN PATENT DOCUMENTS

| | | |
|---|---|---|
| CN | 209731356 U | 12/2019 |
| GB | 2511362 A | 9/2014 |
| WO | WO-2017/068501 A1 | 4/2017 |
| WO | WO-2017/216310 A1 | 12/2017 |
| WO | WO-2018/148471 A2 | 8/2018 |

OTHER PUBLICATIONS

Search Report issued in Great Britain Patent Application No. 1918948.9 dated Jun. 4, 2020.
International Search Report and Written Opinion issued in PCT Patent Application No. PCT/GB2020/053288 dated Apr. 9, 2021.

* cited by examiner

*Primary Examiner* — Xiaoyun R Xu
(74) *Attorney, Agent, or Firm* — Marshall, Gerstein & Borun LLP

(57) ABSTRACT

A portable device for imaging a solid or fluid biological sample. The portable device accepts a wafer for carrying the biological sample. The portable device comprises a camera, and a casing which is configured to receive the wafer. The wafer is positioned inside the casing at an imaging location so that the camera can capture images of the sample. The portable device can also comprise a rotary driver to rotate the wafer between a series of orientations. Each orientation bringing a different area of the biological sample into a field of view of the camera.

16 Claims, 10 Drawing Sheets

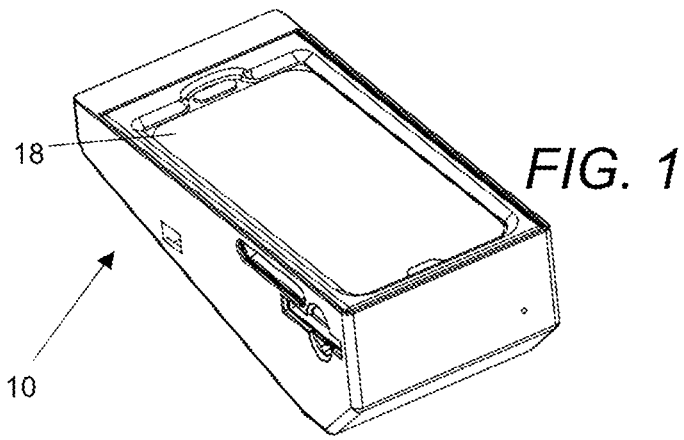
FIG. 1
FIG. 2
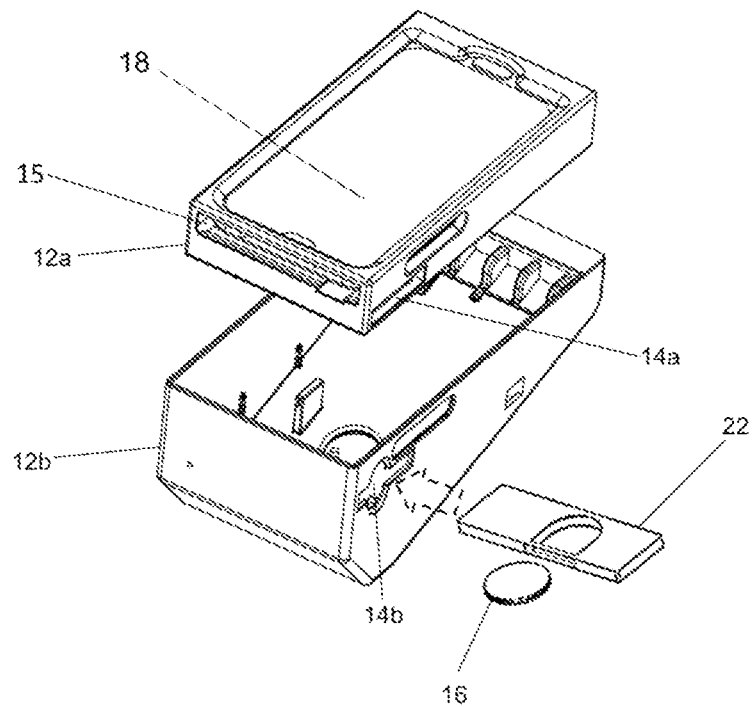

PORTABLE DEVICE FOR IMAGING BIOLOGICAL SAMPLE

FIELD OF THE INVENTION

The present invention relates to a portable device, and associated method, for imaging a biological sample.

BACKGROUND

Conventional systems and methods for biological imaging usually require a microscopic setup operated by humans traversing slides in translational movements, or a very expensive technique such as spectroscopy, flow-cytometry, electrical impedance, or chemical assays. Such technologies are unaffordable for applications of high population impact. Such systems and methods also do not scale and generalise well as they require manual analysis and are based on expensive optics and often provide inaccurate or incompatible results.

SUMMARY OF THE DISCLOSURE

A first aspect of the invention provides a portable device for imaging a biological sample, the portable device comprising:
a wafer for carrying the biological sample;
a camera;
a casing configured to receive the wafer at an imaging location inside the casing;
a rotary driver configured to rotate the wafer at the imaging location between a series of orientations, each orientation bringing a different area of the biological sample into a field of view of the camera.

A second aspect of the invention provides a portable device for imaging a biological sample, the portable device comprising:
a wafer for carrying the biological sample;
a casing configured to carry a camera and further configured to receive the wafer at an imaging location inside the casing; and
a rotary driver configured to rotate the wafer at the imaging location between a series of orientations, each orientation bringing a different area of the biological sample into a field of view of the camera.

The rotation of the wafer provides a compact arrangement which enables the portable device to be sufficiently small to enable it to be moved easily and/or held by hand.

The first aspect of the invention provides a device with a camera, and the second aspect of the invention provides a device with a casing configured to carry a camera.

The rotation of the wafer may be moved with a pure rotation (for example a rotation about a centre of the wafer with no translation) between the series of orientations. Alternatively, the movement of the wafer between the orientations may include an element of translation as well as rotation.

The rotary driver may be a motor (which may be battery operated) or a hand-driven drive mechanism.

The camera may be configured to image the area of the biological sample in the field of view of the camera. The camera may provide a series of images which can be analysed to determine a characteristic of the sample.

Preferably the wafer is circular, for example it may have a circular periphery. This provides a compact arrangement.

Preferably the wafer comprises a slide and a cover, and the wafer is configured so that the biological sample can be carried by the wafer between the slide and the cover. Alternatively, the wafer may have other forms—for example it may consist of a slide with no cover.

Preferably the device comprises a cartridge configured to carry the wafer, wherein the casing is configured to receive the cartridge carrying the wafer inside the casing. This enables the wafer to be introduced into the device easily and placed accurately at the imaging location. The cartridge may be received in its entirety inside the casing, or one end of the cartridge may protrude from the casing to enable it to be gripped and removed.

Preferably the cartridge and the wafer are configured so that the wafer can be inserted into the cartridge and removed from the cartridge. This enables the cartridge to be re-used with different wafers.

Preferably the cartridge is configured to enable the wafer to rotate relative to the cartridge as the wafer rotates at the imaging location.

A lighting system may be arranged to illuminate the biological sample at the imaging location.

Preferably the camera is configured to image the biological sample from a front side of the wafer, the wafer is transparent, and the lighting system is arranged to illuminate the biological sample through the wafer from a back side of the wafer. This enables the sample to be positioned close to the camera. Alternatively, the lighting system may be arranged to illuminate the biological sample from the front side of the wafer.

Preferably the camera comprises a lens positioned adjacent to the imaging location.

Preferably the rotary driver comprises a rotary table which is configured to contact and rotate the wafer. Optionally the rotary table has a rubber surface which is configured to contact the wafer and rotate the wafer by a frictional connection.

Preferably the device further comprises a battery for powering the camera, the rotary driver and/or the lighting system. Optionally the camera, the rotary driver and the lighting system are all battery-powered (in other words, powered by one or more batteries).

Preferably the device has a maximum dimension which is less than 50 cm or less than 40 cm or less than 30 cm.

Preferably the device has a volume less than 5000 $cm^3$, or less than 3000 $cm^3$ or less than 2000 $cm^3$.

Preferably the device, including the camera, has a weight less than 1 kg, or less than 700 g or less than 500 g.

The device may further comprise an axial driver configured to move the wafer at the imaging location in or out of a focal plane of the camera. The axial driver may move the wafer by moving the rotary driver.

Preferably the cartridge is configured to enable the wafer to move relative to the cartridge as the wafer moves in or out of the focal plane.

The axial driver may be a motor (which may be battery operated) or a hand-driven drive mechanism.

Rotary and axial movement of the wafer may be driven by a rotary driver and an axial driver respectively, which may be a pair of separate drive motors for example. Alternatively, the rotary driver may move the wafer along a helical drive path to provide a combined rotary and axial motion—for instance by carrying the wafer on a rotating worm gear.

Preferably the device comprises an engagement mechanism that is configured to dock the rotary table to the wafer. For example, the axial driver may be configured to dock the rotary table to the wafer, as well as moving the wafer in or out of the focal plane.

A further aspect of the invention provides a method of imaging a biological sample with a portable device, the portable device comprising a camera, the method comprising:

inserting a wafer into the portable device;

rotating the wafer inside the portable device between a series of orientations, each orientation bringing a different area of a biological sample carried by the wafer into a field of view of the camera; and for each orientation of the wafer, operating the camera to image the area of the biological sample in the field of view of the camera.

The biological sample at the imaging location may be moved in or out of a focal plane of the camera.

Preferably the wafer carries the biological sample as the wafer is inserted into the portable device. Alternatively, the biological sample may be added to the wafer after the wafer has been inserted.

The rotary driver may comprise a rotary table with a surface which contacts the wafer and rotates the wafer by a frictional connection. Alternatively, the rotary table may couple with the wafer by interlocking indents and projections, or any other coupling arrangement.

Preferably the rotary driver is powered by a battery.

Typically, the rotary driver and/or the axial driver is controlled by a control signal.

The device may comprise a control mechanism (such as a microcontroller) to control the rotary driver and/or the axial driver.

Preferably the camera images the area of the biological sample in the field of view of the camera by acquiring image data or video data.

The device may comprise a communication mechanism (either wired e.g. USB, or unwired, e.g. Bluetooth) for communicating data (such as video or image data) from the device to another device, such as a server.

Optionally the wafer may be rotated to pre-sort molecular elements in the sample before the images are taken.

In some implementations, the wafer may include multiple compartments and dyes disposed in some or all of them.

The biological sample can be obtained from any subject or biological source, animal or human.

Typically, the biological sample is obtained from a living organism.

By way of example, the sample may comprise a smear—a thin layer of blood or other biological sample provided in a form that facilitates imaging to highlight sample features that can be analysed to automatically classify the sample features.

Optionally the camera generates image or video data, and the method further comprises analysing the image or video data to automatically classify sample features.

BRIEF DESCRIPTION OF THE FIGURES

FIG. 1 shows a portable device for imaging a biological sample.

FIG. 2 shows how two parts of the casing are assembled and how the cartridge is inserted into the final assembled portable device.

DETAILED DESCRIPTION

Figure 3:
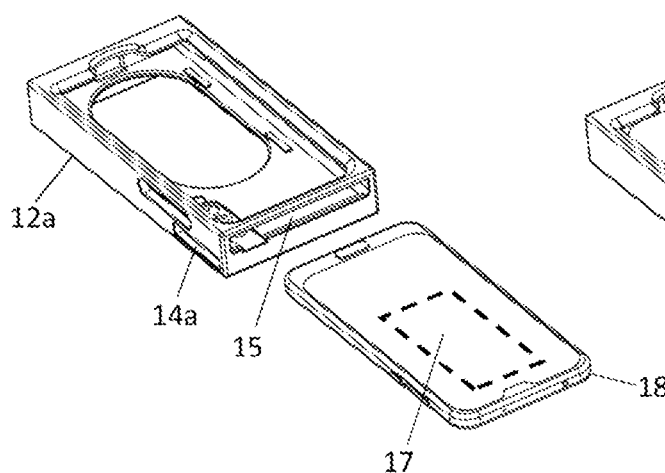
FIG. 3 shows the top part of the casing and a camera.

FIG. 1 shows a portable device 10 for imaging a biological sample. Certain elements of the portable device are shown in FIG. 2, including a wafer 16 for carrying the biological sample; a camera 18; and a casing consisting of a top part 12a and bottom part 12b. The device also has various elements which are omitted from FIG. 2, but shown in later Figures (for example a wafer drive system 50 shown in FIG. 14).

The camera 18 may be a smartphone, for example. The camera 18 is configured to capture video and images. Typically, the camera has a weight of approximately 200 gm.

Figure 4:
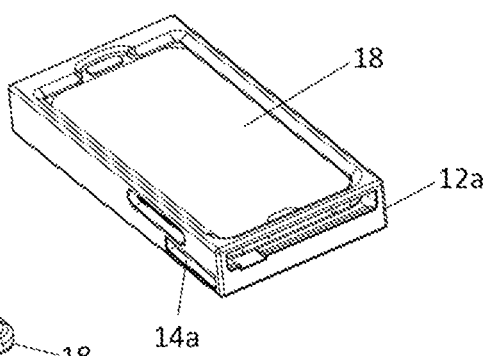
FIG. 4 shows the top part of the casing with the camera.

The top part 12a of the casing has a slot 15 at one end, shown in FIGS. 2 and 3, which receives the camera 18 as shown in FIG. 4. The top part 12a of the casing (carrying the camera 18) is then fitted into the lower part 12b. The two parts of the casing have respective slots 14a, 14b which line up when the casing is in its fully assembled state shown in FIG. 1.

Figure 5:
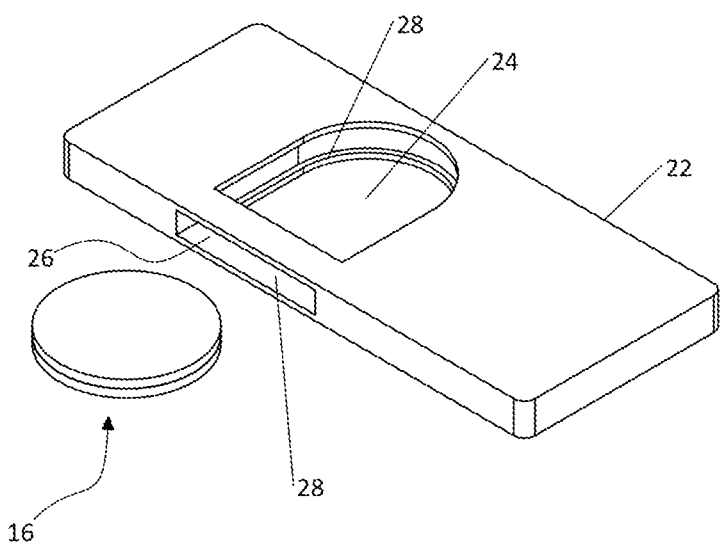
FIG. 5 shows a cartridge and wafer.
Figure 6:
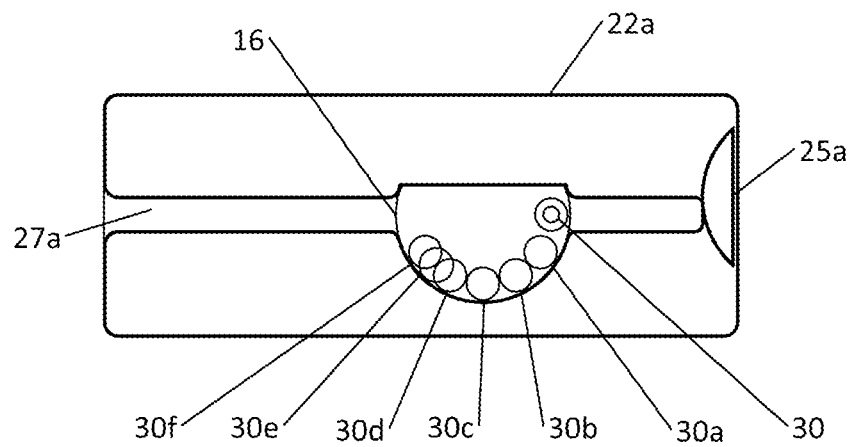
FIG. 6 is a plan view of an alternative cartridge.
Figure 7:
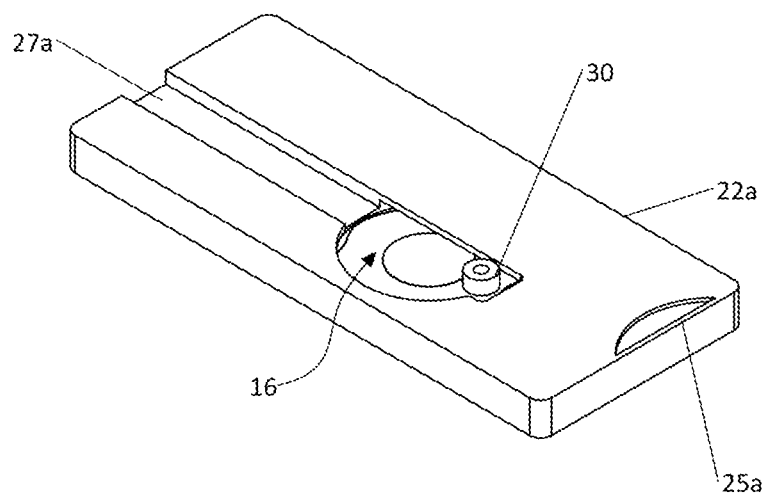
FIG. 7 is an isometric view of the alternative cartridge.

A cartridge 22 shown in FIG. 5 carries the wafer 16. The cartridge 22 has a window 24 and a slot 26 through which the wafer 16 can be slid into the window 24 where it is supported from below by a ledge 28. The cartridge 22 shown in FIGS. 1 and 5 has a basic structure, and an alternative cartridge 22a is shown in FIGS. 6 and 7. The alternative cartridge 22a has a grip feature 25a and a guide slot 27a.

Figure 8:
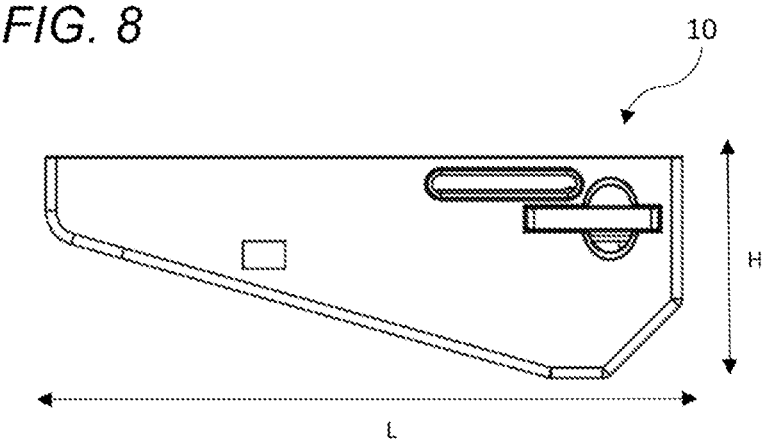
FIG. 8 is a side view of the portable device.
Figure 9:
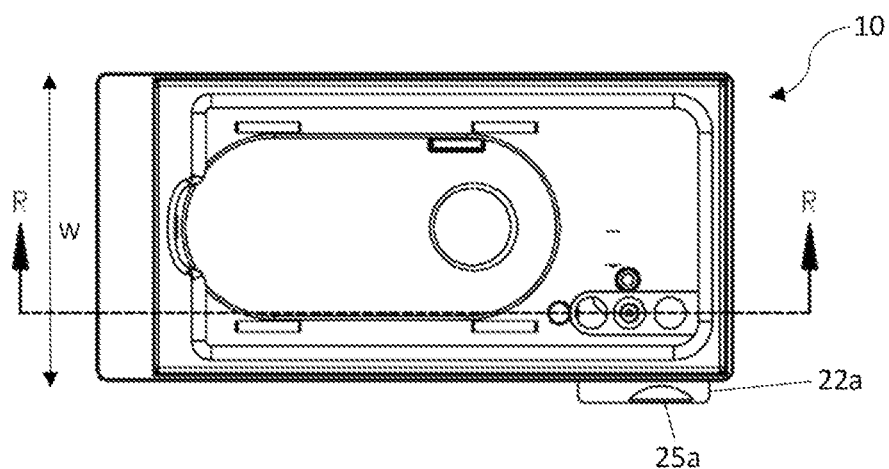
FIG. 9 is a plan view of the portable device.

FIGS. 8 to 12 show the device 10 carrying the cartridge 22a. The cartridge 22a is inserted into the interior of the casing by inserting it through the aligned slots 14a, 14b. When fully inserted, one end of the cartridge 22a protrudes from the casing as shown in FIG. 9 so it can be gripped via the grip feature 25a and removed from the device.

The device has a height, length and width which are labelled H, L and W respectively in FIGS. 8 and 9. By way of example the height H may be 10 cm, the length may be L 20 cm and the width W may be 15 cm, giving a volume of approximately 1500 cm$^3$. The weight of the device (including the cartridge 22a, the wafer 16 and the camera 18) is approximately 400 gm.

Figure 10:
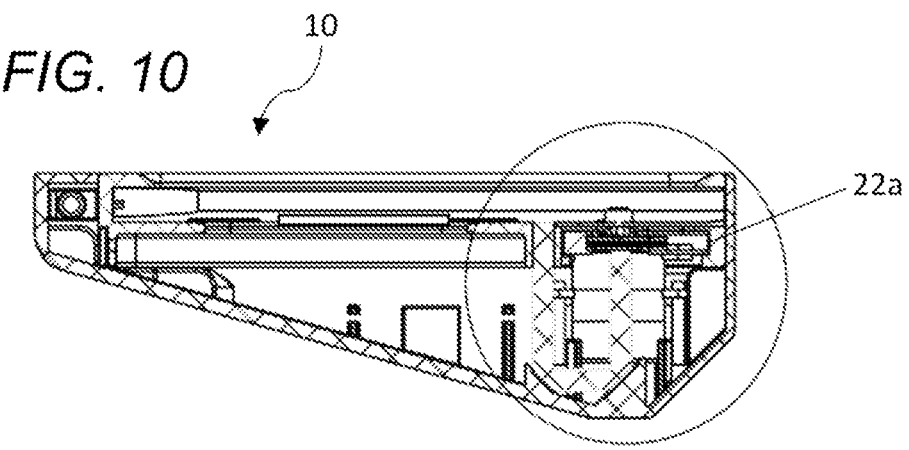
FIG. 10 is a cross section of the portable device viewed along a section R-R.
Figure 11:
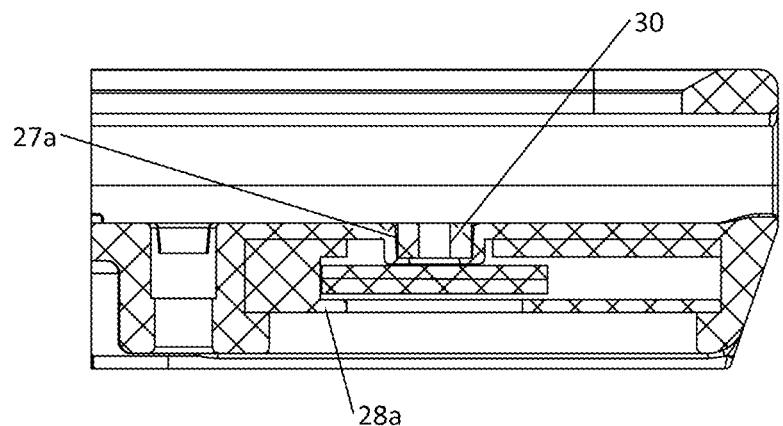
FIG. 11 is a cross section showing the wafer lifted from the ledge, with the wafer drive system omitted.
Figure 12:
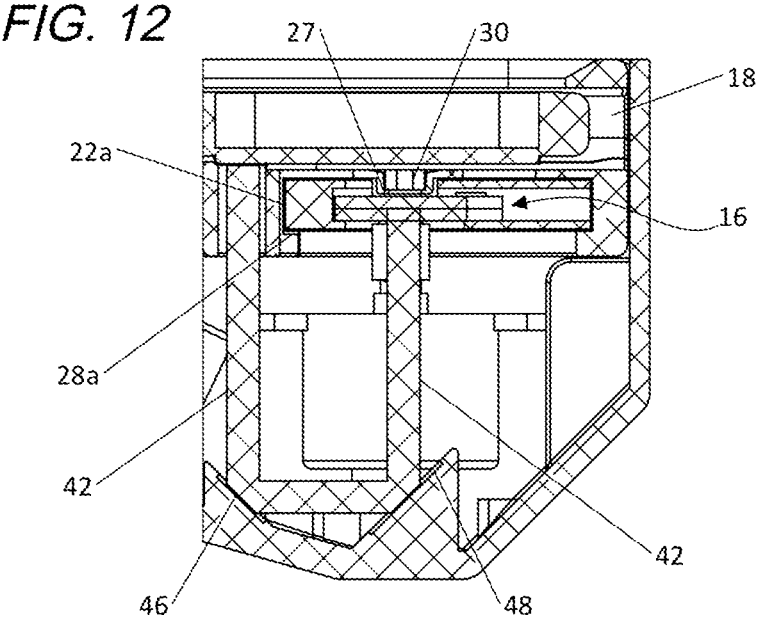
FIG. 12 shows the wafer illumination system.

A wafer drive system 50 is housed in the interior of the portable device 10. FIGS. 10-12 are cross-sectional views showing the interior of the device with the cartridge 22a inserted. The wafer drive system 50 is omitted from FIGS. 10-12 but shown in FIGS. 14-16.

The camera 18 has a protruding lens 30 shown in FIG. 11. As the cartridge 22a is slid into the device, the protruding lens 30 is received in the slot 27a of the cartridge 22a to avoid a clash. When the cartridge 22a is fully inserted, the wafer 16 is positioned at an imaging location with the lens 30 positioned above the edge of the wafer as indicated in FIG. 7, which shows the position of the lens 30 with the rest of the camera 18 omitted. A small area of the wafer 16 is in the field of view of the camera below the lens 30. Examples of the small area of the wafer in the field of view are shown at 30a-30f in FIG. 6.

A lighting system shown in FIG. 12 is arranged to illuminate the wafer 16 (and the biological sample carried by the wafer) at the imaging location. The camera 18 is configured to image the biological sample from a front side of the wafer (i.e. from the top of the view of FIG. 12). The lighting system comprises a light source (not shown) which generates a beam of light 42 which is reflected by a pair of mirrors 46, 48 so that the transparent wafer 16 is illuminated from its back side (i.e. from the bottom of the view of FIG. 12). The light source (not shown) may be part of the camera 18.

Figure 14:
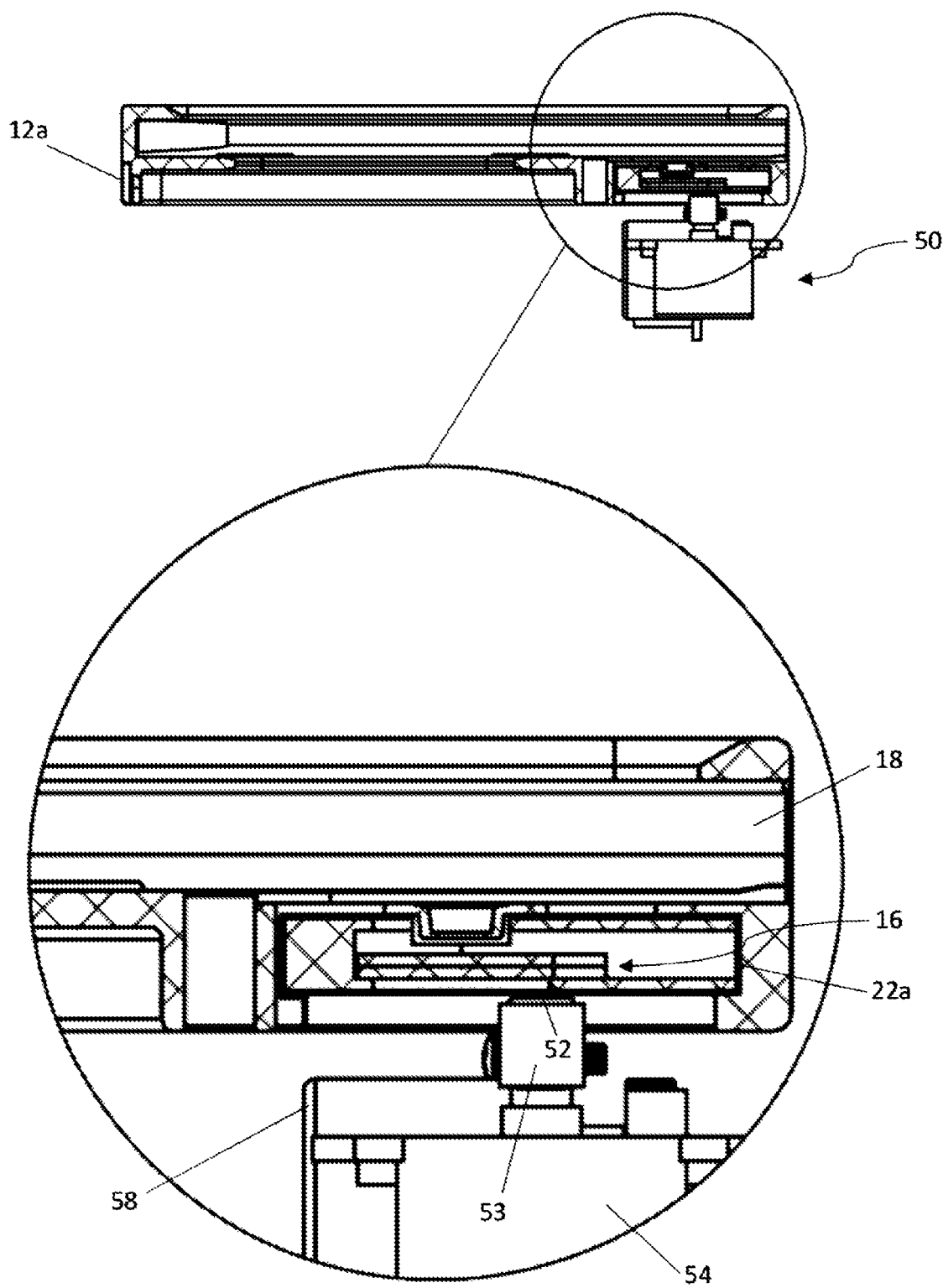
FIG. 14 shows the wafer drive system in a disengaged state such that the rotary driver is not frictionally connected to the wafer.
Figure 15:
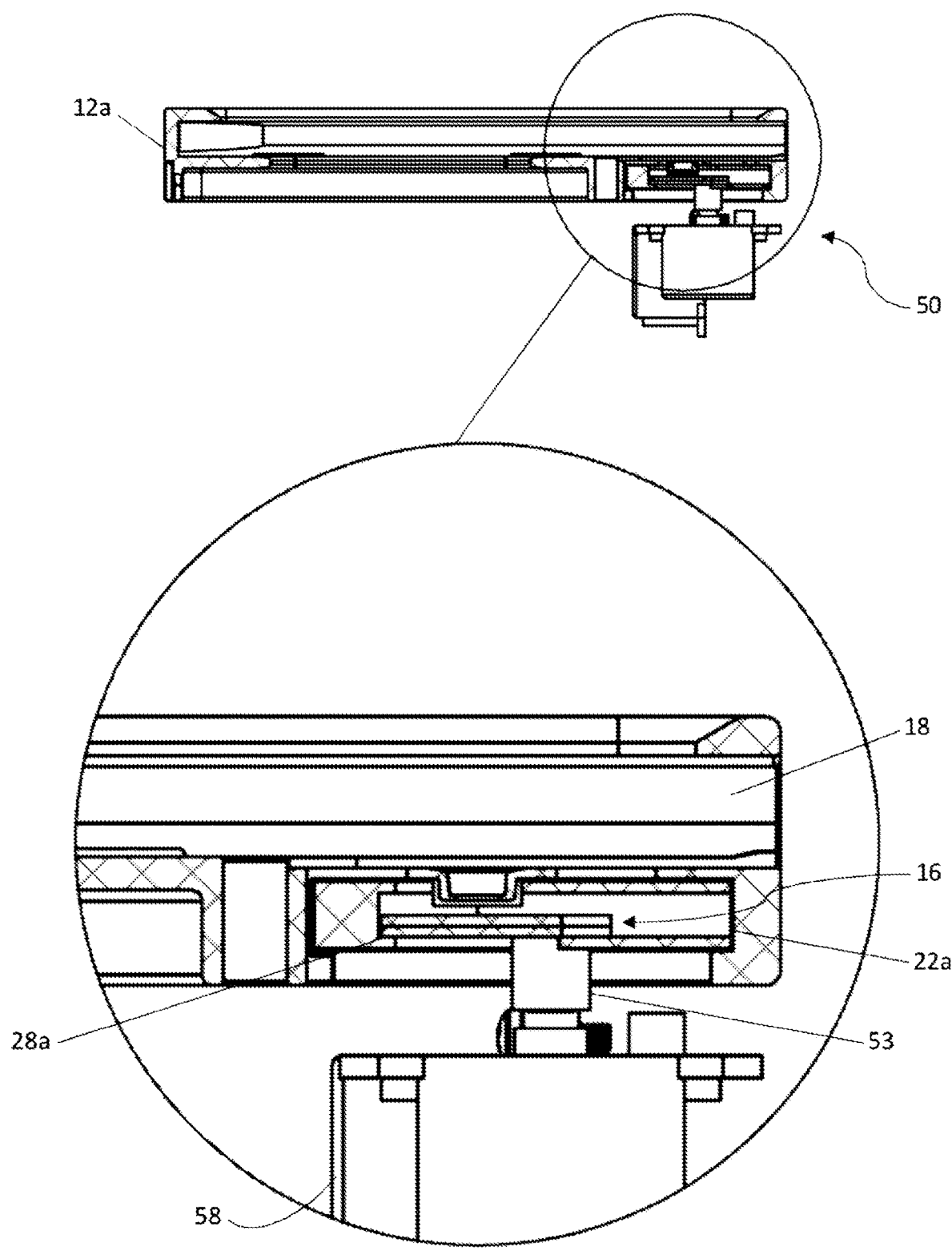
FIG. 15 shows the wafer drive system in an engaged state such that the rotary driver is frictionally connected to the wafer, but the wafer is supported from below by a ledge of the cartridge.

FIGS. 14-16 show the wafer drive system 50, which comprises a table 53 carrying a rubber pad 52 on its upper surface, a rotary drive motor 54 configured to rotate the table 53, and an axial drive motor 56 configured to translate the rotary drive motor 54 up and down. The wafer drive system 50 is offset from the optical axis hence not interfering with the light source or the operation of the camera 18.

FIG. 14 illustrates a disengaged state in which the rubber pad 52 is not in contact with the wafer 16. The wafer drive system 50 can be in this disengaged state when the wafer cartridge 22a is being inserted and removed.

FIG. 15 illustrates an engaged state in which the rubber pad 52 is in contact with the underside of the wafer 16. The axial drive motor 56 can drive the rotary drive motor 54 up and down between the positions of FIG. 14 and FIG. 15.

When the wafer drive system 50 is in the engaged state, the rotary drive motor 54 can be operated to rotate the wafer 16, and the axial drive motor 56 can be operated to drive the wafer up and down.

Figures 16A, 16B:
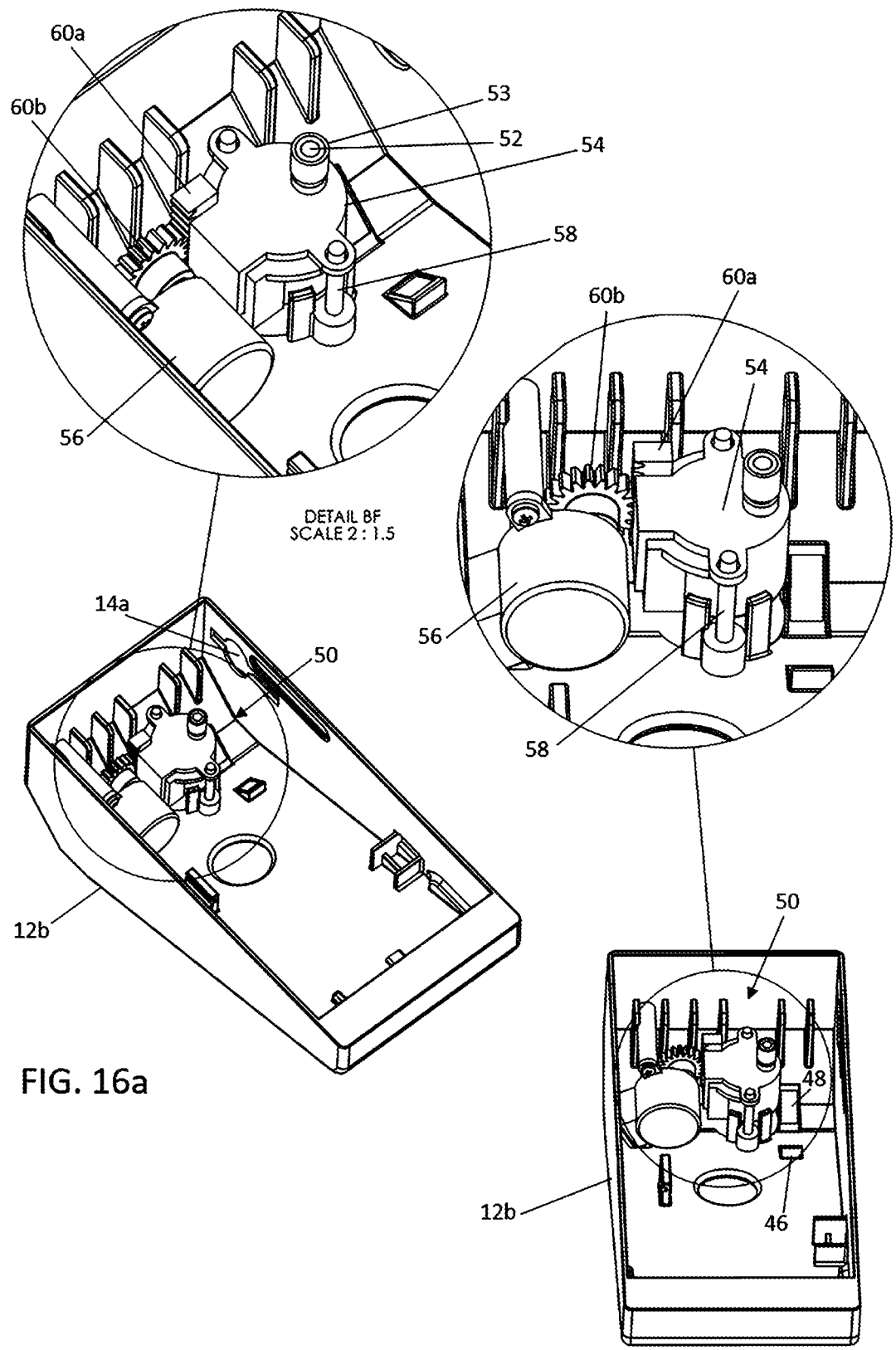
FIGS. 16a and 16b show the lower part of the casing and the wafer drive system.

FIG. 16a shows the lower part 12b of the casing which houses the wafer drive system 50. The rotary drive motor 54 is mounted on a pair of guide rails 58 which guide the rotary drive motor 54 as it is driven up and down by the axial drive motor 56. This enables the rubber pad 52 to be driven up into contact with the wafer, and driven down to disengage from the wafer. The axial drive motor 56 can also drive the wafer up and down to bring the wafer 16 in and out of focus. The rotary drive motor 54 is driven up and down by the axial drive motor 56 via a rack 60a and pinion 60b mechanism.

When the cartridge 22a is fully inserted with the wafer 16 at the imaging location, the axial driver 56 moves the table up so the rubber pad 52 contacts the centre of the underside of the wafer 16. At this stage the wafer 16 is supported from below by the ledge 28a of the cartridge 22a as shown in FIG. 12 and FIG. 15.

The axial driver 56 then continues to push the wafer 16 up slightly so that the wafer is lifted off the ledge 28a to the position shown in FIG. 11 and the biological sample moves into the focal plane of the camera 18. Note that the wafer drive system 50 is not shown in FIG. 11.

Note that the cartridge 22a is configured to enable the wafer 16 to move axially relative to the cartridge 22a, so it can be lifted off the ledge 28a and then move in or out of the focal plane. The cartridge 22a remains stationary during the axial movement of the wafer.

Note also that the cartridge 22a is configured to enable the wafer 16 to rotate relative to the cartridge 22a as the wafer rotates at the imaging location. The cartridge remains stationary during the rotation. The wafer 16 may or may not be in contact with the ledge 28a as it rotates.

This implementation uses gravity to keep the wafer 16 at the bottom of the cartridge on the ledge 28a before being engaged by the rotary rubber pad 52. This requires the device 10 to be positioned parallel or in less than a 90 degree angle with respect to the floor. Another implementation uses one or more springs to hold the wafer 16 in place. In such a case, the spring holds the wafer in its place and is flexible enough for the drivers to rotate and translate the slide.

Figure 17:
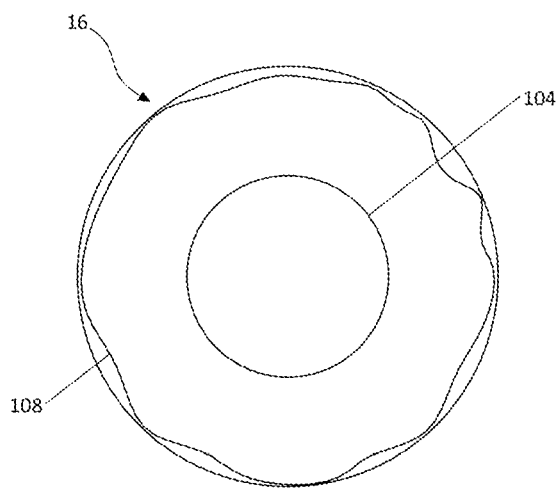
FIG. 17 is a plan view of the wafer holding a sample.
Figure 18:
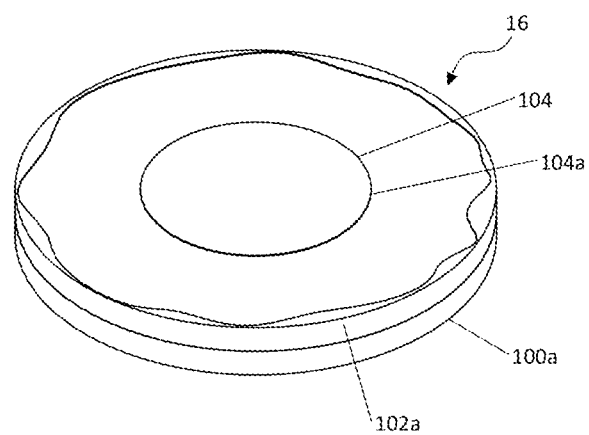
FIG. 18 is an isometric view of the wafer of FIG. 17.
Figure 19:
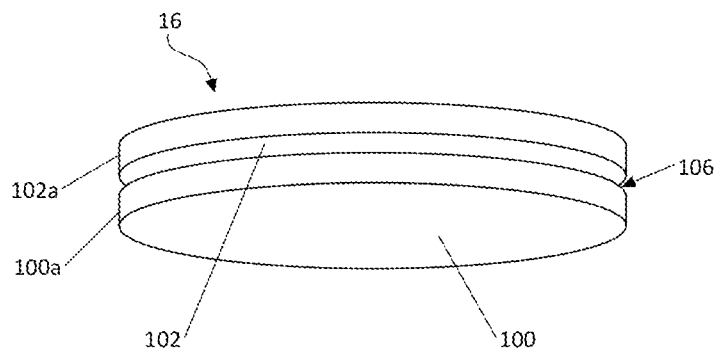
FIG. 19 is an isometric side view of the wafer of FIG. 17.

FIGS. 17, 18 and 19 show the wafer 16 in detail. The wafer 16 comprises a slide 100; a cover 102; and a circular patch of adhesive tape 104 joining the lower face of the slide 100 to the upper face of the cover 102 at the centre of the wafer 16. The slide 100 and the cover 102 are each transparent, and made from a transparent material such as glass or acrylic. The slide 100 and the cover 102 each have a circular periphery 100a, 102a at an edge of the wafer 16. The slide 100 and the cover 102 are spaced apart to provide an annular sample chamber 106 around the adhesive tape 104. The sample chamber 106 extends from an inner periphery at the circular periphery 104a of the adhesive tape 104 to an open circular outer periphery at the edge of the wafer 16.

FIG. 17 shows the edges of a smear 108 which almost completely fills the chamber 106. The chamber 106 is filled such that the sample inside is covered by most of the slide 100 and cover 102.

The maximum dimension of the wafer 16 (in this case, its diameter) may be in the range of 2 cm to 5 cm.

The sample may be, for example: sputum/oral fluid, amniotic fluid, blood, a blood fraction, fine needle biopsy samples (e.g. surgical biopsy, fine needle biopsy, etc.), urine, semen, stool, vaginal fluid, peritoneal fluid, pleural fluid, tissue explant, organ culture, cell culture, and any other tissue or cell preparation, or fraction or derivative thereof or isolated therefrom. The sample may be from a host organism.

The height of the chamber 106 is selected on the basis of the thickness of sample required.

A staining substance may be held in the chamber 106, to dye the sample and the different molecular elements. In some implementations, the dye is a dry dye. In some implementations, the dry dye includes methylene blue and/or eosin, cresyl violet or some other staining product, including those related to fluorescence assays.

The application of the dye or other reagent(s) can be delivered in a various ways. In one example, a small quantity of dye (e.g., about 5 uL of the dye) is deposited inside the wafer 16. In another example, about 2 uL of the stain or other reagent is taken up by a tube or vial in a previous preparation step. In another example, the stain or other reagent is smeared across the wafer by a traditional smearing mechanism.

In some implementations, an external test tube is configured with anticoagulant to prepare a stained sample as an intermediate step before depositing the sample in the wafer 16 by the capillary effect as described above.

The rotary drive motor 54 is configured to rotate the wafer 16 at the imaging location between a series of orientations, each orientation bringing a different area of the biological sample below the lens 30 and into the field of view of the camera 18, as shown in FIG. 6. For each orientation of the wafer 16, the camera 18 is operated to image the area of the biological sample in the field of view of the camera 18

(specifically, the area below the lens 30). The camera 18 may take a series of still images, with the wafer 16 held stationary as each image is taken. Alternatively, a video may be taken as the wafer 16 rotates continuously.

The image or video data acquired by the camera 18 may be stored and/or post processed by the device 10 and/or transmitted from the device 10 for remote storage or post processing.

In the post processing, the image or video data may be analysed to automatically classify sample features. If the post processing is performed by the device 10, then the device 10 comprises a processor configured to analyse the image or video data to automatically classify sample features.

When the wafer drive system 50 is engaged with the wafer 16, the rubber pad 52 frictionally connects to the wafer 16. The rotary drive system 50 can then rotate the wafer 16 between a series of orientations. At each orientation a different part of the biological sample is aligned with the optical axis of the camera 18. Other methods of connecting the table 53 to the wafer 16 may be used.

Figure 13:
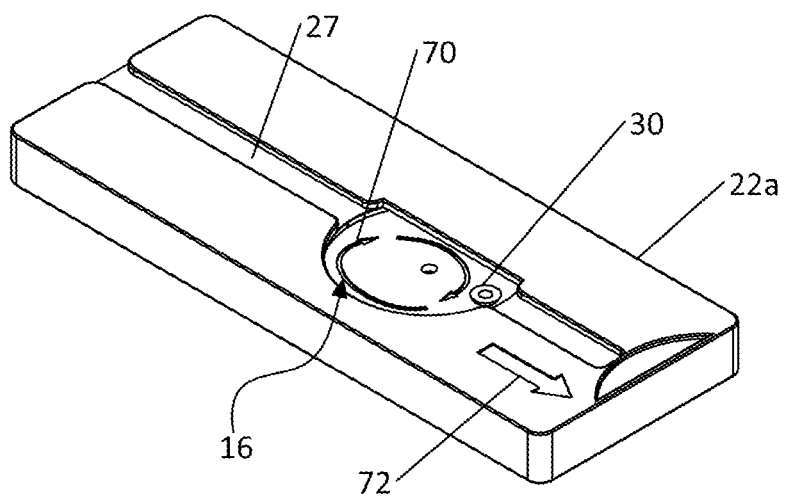
FIG. 13 shows a non-circular trajectory of the centre of the imaged area and a direction of translation of the cartridge.

The areas imaged by the camera 18 may be overlapping or non-overlapping. FIG. 6 gives an example of three overlapping image areas 30d to 30f and three non-overlapping image areas 30a to 30c. In FIG. 6 the wafer 16 moves with a pure rotation about its centre, but in an alternative embodiment the cartridge 22, 22a may also be translated horizontally in and out of the portable device 10 by another driver (not shown) between images, so that the net motion of the wafer 16 includes an element of translation as well as an element of rotation. An example is shown in FIG. 13 which shows a non-circular trajectory 70 of the centre of the imaged area and a direction of translation 72 of the cartridge 22a.

An implementation moves the wafer 16 up and down in order to avoid a feedback system to bring the sample into focus. A video is taken by the camera 18 as the wafer 16 moves up and down with a continuous sinusoidal movement. For certain frames of the video the sample will be in focus, and these frames can be selected a posteriori as part of image post-processing. This implementation reduces the need for communication between a controller (not shown, however, may be part of the camera 18) and the axial drive motor 56 resulting in a significant reduction and device size minimisation from sampling area movement and reduction of the complexity of the portable device 10, and sampling method and mechanism.

Note that in this implementation the axial drive motor 56 is configured both as an engagement mechanism to dock the rotary table 53 to the wafer, and as a focus mechanism for moving the wafer 16 in and out of the focal plane.

The device 10 is battery powered, with one or more batteries for powering the camera, the rotary drive motor 54, the axial drive motor 56 and the lighting system. Optionally the camera 18 is a smartphone with a battery 17 shown schematically in FIG. 3. The rotary drive motor 54, the axial drive motor 56 and the lighting system may all be powered by the battery 17.

The invention claimed is:

1. A portable device for imaging a biological sample, the portable device comprising:
   a wafer for carrying the biological sample;
   a camera;
   a casing configured to receive the wafer at an imaging location inside the casing;
   a rotary driver configured to rotate the wafer at the imaging location between a series of orientations, each orientation bringing a different area of the biological sample into a field of view of the camera; and
   a cartridge configured to carry the wafer, wherein the casing is configured to receive the cartridge carrying the wafer, and wherein the cartridge is configured to enable the wafer to rotate relative to the cartridge as the wafer rotates at the imaging location.

2. A device according to claim 1, wherein the wafer is circular.

3. A device according to claim 1, wherein the wafer comprises a slide and a cover, and the wafer is configured so that the biological sample can be carried by the wafer between the slide and the cover.

4. A device according to claim 1, wherein the cartridge and the wafer are configured so that the wafer can be inserted into the cartridge and removed from the cartridge.

5. A device according to claim 1, further comprising a lighting system arranged to illuminate the biological sample at the imaging location.

6. A device according to claim 5, wherein the camera is configured to image the biological sample from a front side of the wafer, the wafer is transparent, and the lighting system is arranged to illuminate the biological sample through the wafer from a back side of the wafer.

7. A device according to claim 1, wherein the rotary driver comprises a rotary table with a rubber surface which is configured to contact the wafer and rotate the wafer by a frictional connection.

8. A device according to claim 1, further comprising a battery for powering the camera, the rotary driver and/or the lighting system.

9. A device according to claim 1, wherein the device has a maximum dimension which is less than 50 cm or less than 40 cm or less than 30 cm.

10. A device according to claim 1, wherein the device has a weight less than 1 kg, or less than 700 g or less than 500 g.

11. A device according to claim 1, further comprising an axial driver configured to move the wafer at the imaging location in or out of a focal plane of the camera.

12. A device according to claim 1, wherein the rotary driver is further configured to move the wafer at the imaging location in or out of a focal plane of the camera.

13. A device according to claim 1, wherein the rotary driver comprises a rotary table which is configured to contact the wafer and rotate the wafer, and the device further comprises an engagement mechanism that is configured to dock the rotary table to the wafer.

14. A device according to claim 1, further comprising an axial driver configured to move the wafer at the imaging location in or out of a focal plane of the camera, wherein the cartridge is configured to enable the wafer to move relative to the cartridge as the wafer moves in or out of the focal plane.

15. A device according to claim 1, wherein the device comprises a processor configured to analyse the image or video data to automatically classify sample features.

16. A portable device for imaging a biological sample, the portable device comprising:
   a wafer for carrying the biological sample;
   a casing configured to carry a camera and further configured to receive the wafer at an imaging location inside the casing;
   a rotary driver configured to rotate the wafer at the imaging location between a series of orientations, each orientation bringing a different area of the biological sample into a field of view of the camera; and a cartridge configured to carry the wafer, wherein the casing is configured to receive the cartridge carrying the wafer, and wherein the cartridge is configured to enable the wafer to rotate relative to the cartridge as the wafer rotates at the imaging location.

* * * * *